United States Patent
Hsieh

(10) Patent No.: US 8,411,148 B2
(45) Date of Patent: Apr. 2, 2013

(54) AUTO IRIS LENS CALIBRATION DEVICE AND METHOD

(75) Inventor: Ming-Chih Hsieh, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 34 days.

(21) Appl. No.: 13/171,471

(22) Filed: Jun. 29, 2011

(65) Prior Publication Data

US 2012/0026341 A1    Feb. 2, 2012

(51) Int. Cl.
*H04N 17/00*    (2006.01)
*H04N 5/238*    (2006.01)

(52) U.S. Cl. .................... 348/187; 348/363

(58) Field of Classification Search .......... 348/187, 348/211.9, 240.99, 240.2, 240.3, 361–363, 348/371; 702/116; 396/213, 242
See application file for complete search history.

(56) References Cited

U.S. PATENT DOCUMENTS

| | | | |
|---|---|---|---|
| 5,489,923 A * | 2/1996 | Marshall et al. | 345/156 |
| 5,767,950 A * | 6/1998 | Hawver et al. | 355/71 |
| 7,760,919 B2 * | 7/2010 | Namgoong | 382/117 |
| 2002/0041383 A1 * | 4/2002 | Lewis et al. | 358/1.9 |
| 2006/0250509 A1 * | 11/2006 | Koshiba | 348/272 |
| 2007/0153102 A1 * | 7/2007 | Suzuki et al. | 348/240.99 |
| 2008/0175571 A1 * | 7/2008 | Aggarwal et al. | 392/416 |
| 2011/0194851 A1 * | 8/2011 | Hjelmstrom | 396/242 |

* cited by examiner

Primary Examiner — Victor Kostak
(74) Attorney, Agent, or Firm — Altis Law Group, Inc.

(57) ABSTRACT

An iris calibration device includes one or more groups of light sources, a microcontroller (MCU), and a display. The MCU connects to a system on chip (SoC) of a digital camera device. The digital camera device includes an iris lens. The MCU receives an "on" command or an "off" command from the SoC. The MCU turns on or turn off a group of light sources according to the "on" command or the "off" command The SoC adjusts the iris lens according to an average luminance of the one or more light sources sensed by a sensor of the digital camera device.

6 Claims, 3 Drawing Sheets

AUTO IRIS LENS CALIBRATION DEVICE AND METHOD

BACKGROUND

1. Technical Field

Embodiments of the present disclosure generally relate to calibration of iris lenses, and more particularly to an auto iris lens calibration device and an inspecting method.

2. Description of Related Art

In a digital camera device, such as a camera, an iris lens of the digital camera device can improve quality of images by adjustment of the iris lens. However, is difficult to precisely control adjustment of the iris lens. Therefore, the quality of the images captured by the digital camera device cannot reach a desired result. Test people need data to know when the iris lens is precisely adjusted and know a lens magnification when the iris lens is adjusted.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

Figure 1:
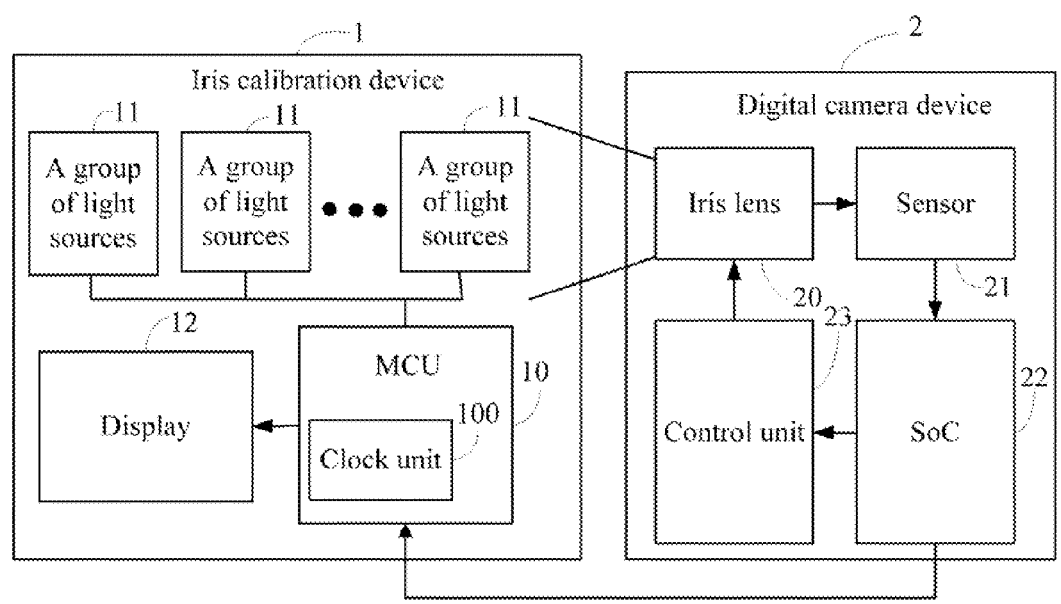
FIG. 1 is a block diagram of one embodiment of an iris lens calibration device.

FIG. 1 is a block diagram of one embodiment of an iris lens calibration device 1. The iris lens calibration device 1 includes a microcontroller (MCU) 10, one or more groups of light sources 11, and a display 12. In one embodiment, the groups of light sources 11 are connected with each other in parallel and electronically connected to the MCU 10. The MCU 10 includes a clock unit 100. In one embodiment, the clock unit 100 may be used to provide a system time to the MCU 10.

A digital camera device 2 includes an iris lens 20, a sensor 21, a system on chip (SoC) 22, and a control circuit 23. In some embodiments, the MCU 10 may communicate with the SoC 22 via an inter-integrated circuit (I2C) bus or a console interface. The iris lens 20 may be auto adjusted.

The SoC 22 determines if a lens magnification of the iris lens 11 is 100% or 0. If an initial value of the lens magnification of the iris lens 11 is 100%, then that means all the light sources are off, and one group of light source 11 will be turned on at a time. The SoC 22 sends an "on" command to the MCU 10 for the MCU 10 to turn on a group of light sources 22. If the lens magnification of the iris lens 11 is 0, that means all the light sources are on, and one group of light sources 11 will be turned off at a time. The SoC 22 sends an "off" command to the MCU 10 for the MCU 10 to turn off the group of light sources 22 according to the "off" command. The SoC 22 sends the current lens magnification of the iris lens 11 to the MCU 10 when sending the "on" command or the "off" command. The MCU 10 displays the lens magnification and a time provided by the clock unit 100 on the display 12. Test people can obtain the lens magnification to analyze performance of the iris lens 11.

The iris lens 20 captures images of the one or more groups of light sources 11 after a group of light sources 11 is turned on or turned off. The sensor 21 senses an average luminance from each image and sends the average luminance to the SoC 22. The SoC 22 controls the control circuit 23 to adjust the iris lens 20 according to the average luminance, and calculates the lens magnification after adjusting the iris lens 20. The SoC 22 stores a standard range corresponding to each average luminance of the one or more groups of light sources 11.

Figure 2A:
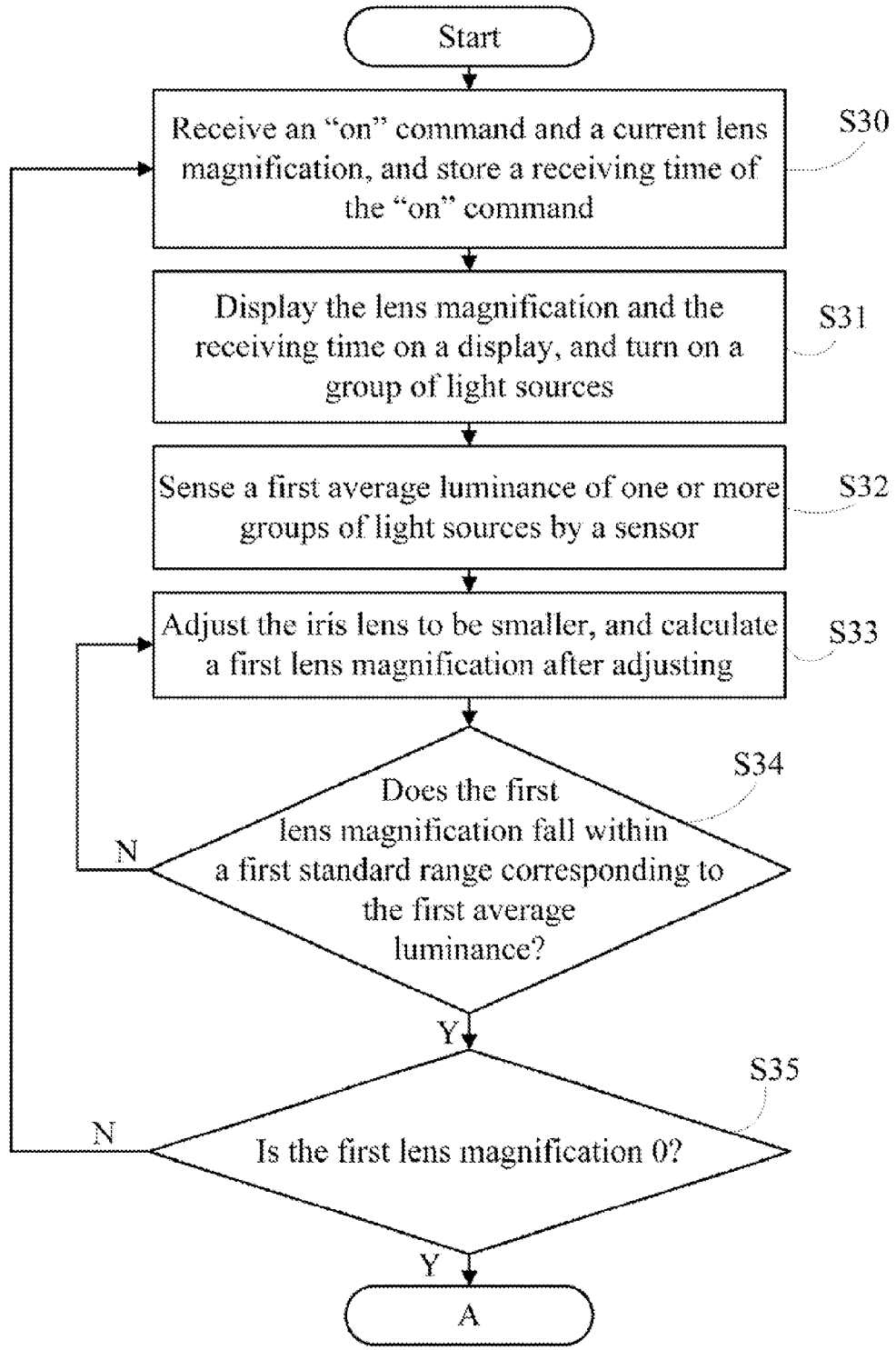
FIG. 2a and FIG. 2b are flowcharts illustrating an iris lens inspecting method according to one embodiment.
Figure 2B:
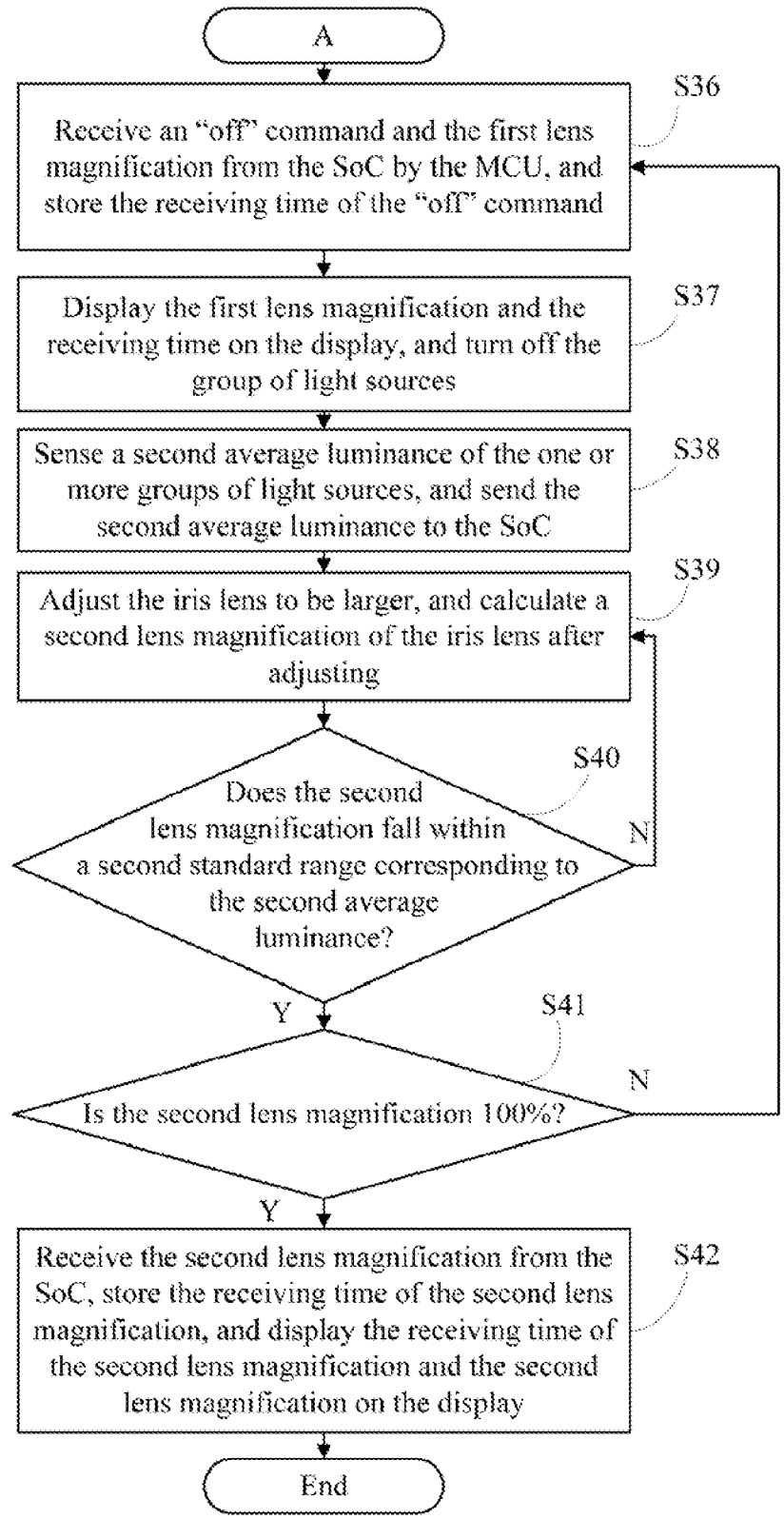

FIGS. 2a and 2b are flowcharts illustrating an iris lens inspecting method according to one embodiment. Depending on the embodiment, additional blocks may be added, others removed, and the ordering of the blocks may be changed. In this embodiment the initial value of the lens magnification is 100%.

In block S30, the MCU 10 receives an "on" command and a current lens magnification of the iris lens 20 from the SoC 22, and stores a receiving time of the "on" command provided by the clock unit 100.

In block S31, the MCU 10 displays the current lens magnification and the receiving time on the display 12, and turns on a group of light sources 11 according to the "on" command In block S32, the sensor 21 senses a first average luminance of the one or more groups of light sources 11, and sends the first average luminance to the SoC 22.

In block S33, the SoC 22 controls the control circuit 23 to adjust the iris lens 20 to be smaller according to the first average luminance, and calculates a first lens magnification after adjusting. In one embodiment, adjusting smaller is to set a f-number of the iris lens 20 to be smaller.

In block S34, the SoC 22 detects if the first lens magnification falls within a first standard range corresponding to the first average luminance. If the first lens magnification falls within the first standard range, block S35 is implemented. If the first lens magnification falls out of the first standard range, block S33 is repeated.

In block S35, the SoC 22 detects if the first lens magnification is 0. If the first lens magnification is 0, block S36 is implemented. If the first lens magnification is not 0, block S30 is repeated.

In block S36, the MCU 10 receives an "off" command and the first lens magnification from the SoC 22, and stores the receiving time of the "off" command In block S37, the MCU 10 displays the first lens magnification and the receiving time of the off" command on the display 12, and turns off the group of light sources 11 according to the off" command.

In block S38, the sensor 21 senses a second average luminance of the one or more of groups of light sources 11, and sends the second average luminance to the SoC 22.

In block S39, the SoC 22 controls the control circuit 23 to adjust the iris lens 20 larger according to the second average luminance, and calculates a second lens magnification of the iris lens 20 after adjusting.

In block S40, the SoC 22 detects if the second lens magnification falls within a second standard range corresponding to the second average luminance. If the second lens magnification falls within the second standard range, block S41 is implemented. If the second lens magnification falls out of the second standard range, block S39 is repeated.

In block S41, the SoC 22 detects if the second lens magnification is 100%. If the second lens magnification is 100%, block S42 is implemented. If the second lens magnification is not 100%, block S36 is repeated.

In block S42, the MCU 10 receives the second lens magnification from the SoC 22, stores the receiving time of the second lens magnification, and displays the receiving time of the second lens magnification and the second lens magnification on the display 12.

Although certain inventive embodiments of the present disclosure have been specifically described, the present disclosure is not to be construed as being limited thereto. Various changes or modifications may be made to the present disclosure beyond departing from the scope and spirit of the present disclosure.

What is claimed is:

1. An iris lens calibration device, comprising:
   a microcontroller (MCU) operable to receive an "on" command and a first lens magnification of an iris lens from a system on chip (SoC) of a digital camera device, and turn on a group of light sources according to the "on" command;
   the MCU also operable to receive an "off" command and a second lens magnification of the iris lens from the SoC, and turn off the group of light sources according to the "off" command; and
   a display operable to display the first lens magnification, the second lens magnification, and the receiving time of the "on" command and the "off" command.

2. The iris lens calibration device as described in claim 1, wherein the MCU comprises a clock unit to provide receiving time of the "on" command and the "off" command.

3. The iris lens calibration device as described in claim 1, wherein the digital camera device comprises a sensor operable to sense a first average luminance of one or more groups of light sources after the group of light sources being turned on, sense a second average luminance of the one or more groups of light sources after the group of light sources being turned off, and send the first average luminance and the second average luminance to the SoC.

4. The iris lens calibration device as described in claim 3, wherein
   the SoC is also operable to adjust the iris lens to be smaller if the first lens magnification falls out of a first standard range corresponding to the first average luminance, and adjust the iris lens to be larger if the second lens magnification falls out of a second standard range corresponding to the second average luminance; and
   the SoC is further operable to calculate the lens magnification after adjusting the iris lens, and send the calculated lens magnification to the MCU.

5. A method of calibrating an iris lens, comprising:
   (a) receiving an "on" command and a first lens magnification of the iris lens by a microcontroller (MCU) from a system on chip (SoC) of a digital camera device, storing a receiving time of the "on" command, and displaying the receiving time on a display;
   (b) turning on the group of light sources by the MCU according to the "on" command;
   (c) sensing a first average luminance of one or more groups of light sources after the group of light sources being turned on, and sending the first average luminance to the SoC by a sensor of the digital camera device;
   (d) adjusting the iris lens to be smaller according to the first average luminance and calculating a first lens magnification by the SoC after adjusting if the first lens magnification falls out of a first standard range corresponding to the first average luminance, sending the "on" command to the MCU to turn on a next group of light sources, and repeating block (a) to block (d) till the lens magnification is 0;
   (e) sending an "off" command to the MCU by the SoC;
   (f) turning off the group of light sources by the MCU according to the "off" command;
   (g) sensing a second average luminance of the one or more groups of light sources after the group of light sources being turned off, and sending the second average luminance to the SoC by the sensor; and
   (h) adjusting the iris lens to be larger according to the second average luminance and calculating a second lens magnification by the SoC after adjusting if the second lens magnification falls out of a second standard range corresponding to the second average luminance, repeating block (f) to block (h) till the lens magnification is 100%.

6. A non-transitory storage medium having stored thereon instructions that, when executed by a processor, cause the processor to perform a method of inspecting an iris lens, comprising:
   (a) receiving an "on" command and a first lens magnification of the iris lens by a microcontroller (MCU) from a system on chip (SoC) of a digital camera device, storing a receiving time of the "on" command, and displaying the receiving time on a display;
   (b) turning on the group of light sources by the MCU according to the "on" command;
   (c) sensing a first average luminance of one or more groups of light sources after the group of light sources being turned on, and sending the first average luminance to the SoC by a sensor of the digital camera device;
   (d) adjusting the iris lens to be smaller according to the first average luminance and calculating a first lens magnification by the SoC after adjusting if the first lens magnification falls out of a first standard range corresponding to the first average luminance, sending the "on" command to the MCU to turn on a next group of light sources, and repeating block (a) to block (d) till the lens magnification is 0;
   (e) sending an "off" command to the MCU by the SoC;
   (f) turning off the group of light sources by the MCU according to the "off" command;
   (g) sensing a second average luminance of the one or more groups of light sources after the group of light sources being turned off, and sending the second average luminance to the SoC by the sensor; and
   (h) adjusting the iris lens to be larger according to the second average luminance and calculating a second lens magnification by the SoC after adjusting if the second lens magnification falls out of a second standard range corresponding to the second average luminance, repeating block (f) to block (h) till the lens magnification is 100%.

* * * * *